(12) United States Patent
Yamaguchi et al.

(10) Patent No.: US 6,485,283 B1
(45) Date of Patent: Nov. 26, 2002

(54) BLOW MOLDING DIE FOR PRODUCING BLOWN FILM

(75) Inventors: Takanari Yamaguchi, Tsukuba (JP); Motonobu Furuta, Chiba (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/404,300

(22) Filed: Sep. 24, 1999

(30) Foreign Application Priority Data

Sep. 25, 1998 (JP) .......................... 10-271489
Oct. 2, 1998 (JP) .......................... 10-281445

(51) Int. Cl.[7] .......................... B29C 47/20
(52) U.S. Cl. .................. 425/72.1; 425/378.1; 425/380; 425/467
(58) Field of Search ................ 425/380, 467, 425/72.1, 378.1

(56) References Cited

U.S. PATENT DOCUMENTS

| | | | | |
|---|---|---|---|---|
| 2,400,055 A | * | 5/1946 | Wallace | 425/378.1 |
| 2,913,763 A | * | 11/1959 | Longstreth et al. | 425/467 |
| 3,432,886 A | | 3/1969 | Haley | 425/380 |
| 3,482,280 A | | 12/1969 | Ronden | 425/371 |
| 3,611,493 A | * | 10/1971 | Fogelberg et al. | 425/467 |
| 4,045,154 A | * | 8/1977 | Ratheiser | 425/380 |
| 4,061,461 A | * | 12/1977 | Hessenthaler | 425/467 |
| 5,496,164 A | * | 3/1996 | Czarnik | 425/380 |
| 5,624,692 A | * | 4/1997 | Hendess | 425/380 |

FOREIGN PATENT DOCUMENTS

| | | |
|---|---|---|
| DE | 1629784 | 1/1972 |
| GB | 2291831 A | 2/1996 |
| JP | 2635383 | 4/1997 |

OTHER PUBLICATIONS

Final Report on Thermotropic Liquid Crystal Polymers, A Battele Multiclient Report p. 205–229, (Jul. 1, 1989).

* cited by examiner

Primary Examiner—Robert Davis
(74) Attorney, Agent, or Firm—Birch, Stewart, Kolasch & Birch, LLP

(57) ABSTRACT

Provided is a blown molding die to obtain a film having excellent properties and good appearance in blown film forming of a thermoplastic resin manifesting anisotropy in molten state. The blow molding die has a simple structure compared with a conventional spider die, and can be produced easily and at low cost.

5 Claims, 8 Drawing Sheets

BLOW MOLDING DIE FOR PRODUCING BLOWN FILM

BACKGROUND OF THE INVENTION

1. Field of the Invention

The present invention relates to a blow molding die which is useful in forming a blown film from a thermoplastic resin manifesting anisotropy in molten state, and a method for producing a blown film thereof.

2. Description of the Related Art

Among typical examples of thermoplastic resins manifesting anisotropy in molten state, so-called liquid crystal polymers are liquid crystal polyesters. This liquid crystal polyester is generally called a melting type liquid crystal (thermotropic liquid crystal) polymer and, does not cause entangling even in molten states owing to rigidity of the molecule, forms polydomain having liquid crystal property and reveals behavior that the molecular chain is significantly aligned to flow direction by low shear strength, unlike liquid crystal polymers such as polyethylene terephthalate and polybutylene terephthalate. The liquid crystal polyester has merits that it has excellent melt flow property, it can provide easily a thin wall molded article having about 0.2 to 0.5 mm thickness, and further this molded article shows high strength and high rigidity, owing to the above-described specific behavior.

On the other hand, a liquid crystal polyester is a polyester having feature that the molecule is oriented in molten state due to strong intermolecular mutual action, from the standpoint that it is a raw material of a film. Further, because of strong intermolecular mutual action and molecular orientation, the liquid crystal polyester has been expected to be used industrially as a film raw material having functions such as gas barrier property and the like in addition to well-known properties such as high strength, high elasticity and high heat resistance.

However, a liquid polyester has demerit that anisotropy is extremely high. Further, since a liquid crystal polyester does not cause entangling even in molten state and the molecule chain is significantly aligned to flow direction due to rigidity of the molecule as described above, it reveals behavior that melt viscosity decreases even by slight shear strength and melt tension in molten state is extremely low. Therefore, it is very difficult to keep form of a liquid crystal polyester in molten state, further properties of longitudinal and transverse directions are not easily balanced since the molecule is oriented, and in the extreme case, the liquid crystal polyester is torn along molecule orientation direction, leading to large problem that applicability in fields such as film forming, blow molding and the like is poor. Therefore, a liquid crystal polyester film utilizing functions of a liquid polyester has not been put into practical use to date.

Regarding such a liquid crystal polyester, trials have been made of a method for producing a film by blown film forming. In the blown film forming, a rein which has been melted and kneaded in an extruder is extruded to form cylindrical resin through an annular slit (resin flow route) of a cylindrical blow molding die, a certain amount of air is blown into the resulting cylindrical resin to expand the resin, and the expanded resin is continuously wound up with cooling to obtain a tubular film.

As a method for producing a film by such blown film forming, there is known for example that descried in Japanese Patent Application Publication (JP-B) No. 9-2635383.

A blow molding die used in the method for producing a liquid crystal polyester film described in this publication has an inner lip, outer lip, inner mandrel and die body and further, an aeration hole for introducing air, and a polymer flow route utilizing a spiral mandrel for uniformalizing flow rate of polymer materials.

A liquid crystal polyester has properties that it has lower viscosity and flows easily as compared with polyethylene and polypropylene. Therefore, in the above-described conventional technologies, a part of a resin does not flow between spiral projections (spiral groove) formed on a spiral mandrel, but flows to upper direction passing through directly between the projections and the die body. Therefore, pressure dispersion effect by a spiral groove is not obtained, resin flow becomes ununiform along peripheral direction, as a result, weld line, unevenness in thickness and the like occur in the resulted film, accordingly, properties and appearance of the resulted film are not fully satisfactory.

On the other hand, among conventional blow molding methods are methods using a so-called spider die in which a mandrel is supported on a die body by a plurality of supporting means, other than a blow molding die comprising a spiral mandrel as described in the above-described conventional technology, so-called spiral die. However, this spider die has not been often used since flow controlling property is poor because a plurality of supporting means interrupt flow of a resin, resin flow along peripheral direction becomes ununiform as described above and therefore this die has not been believed to be suitable for a liquid crystal polyester having anisotropy.

The object of the present invention is to provide a blow molding die which makes it possible to obtain a film having excellent properties and good appearance in blown film forming of a thermoplastic resin manifesting anisotropy in molten state, and a method for producing such a film.

SUMMARY OF THE INVENTION

The present inventors have intensively studied, and as a result, found that a molten liquid crystal polyester can be allowed to flow through a resin flow route in a spider die with low pressure since this polyester has low viscosity and flows easily, and in this case, it is possible to support a mandrel on a die body in the view point of strength even if dimension of supporting means is made small or the number of supporting means is reduced.

Namely, the present invention provides a blow molding die used in forming a blown film from a thermoplastic resin which manifests anisotropy in molten state, wherein the die comprises a die body having a hollow portion, a mandrel placed in the hollow portion of the die body, a plurality of supporting means which are placed in an annular resin flow route formed in gap between the die body and the mandrel and support the mandrel on the die body and an aeration route for passing a gas to expand cylindrical resin extruded through a die gap (resin outlet part of the resin flow route), and the total maximum horizontal cross section of the plurality of supporting means in the resin flow route is one-fifth or less of the horizontal cross section of the resin flow route at any placing position of the plurality of supporting means.

DETAILED DESCRIPTION OF THE INVENTION

Figure 1:
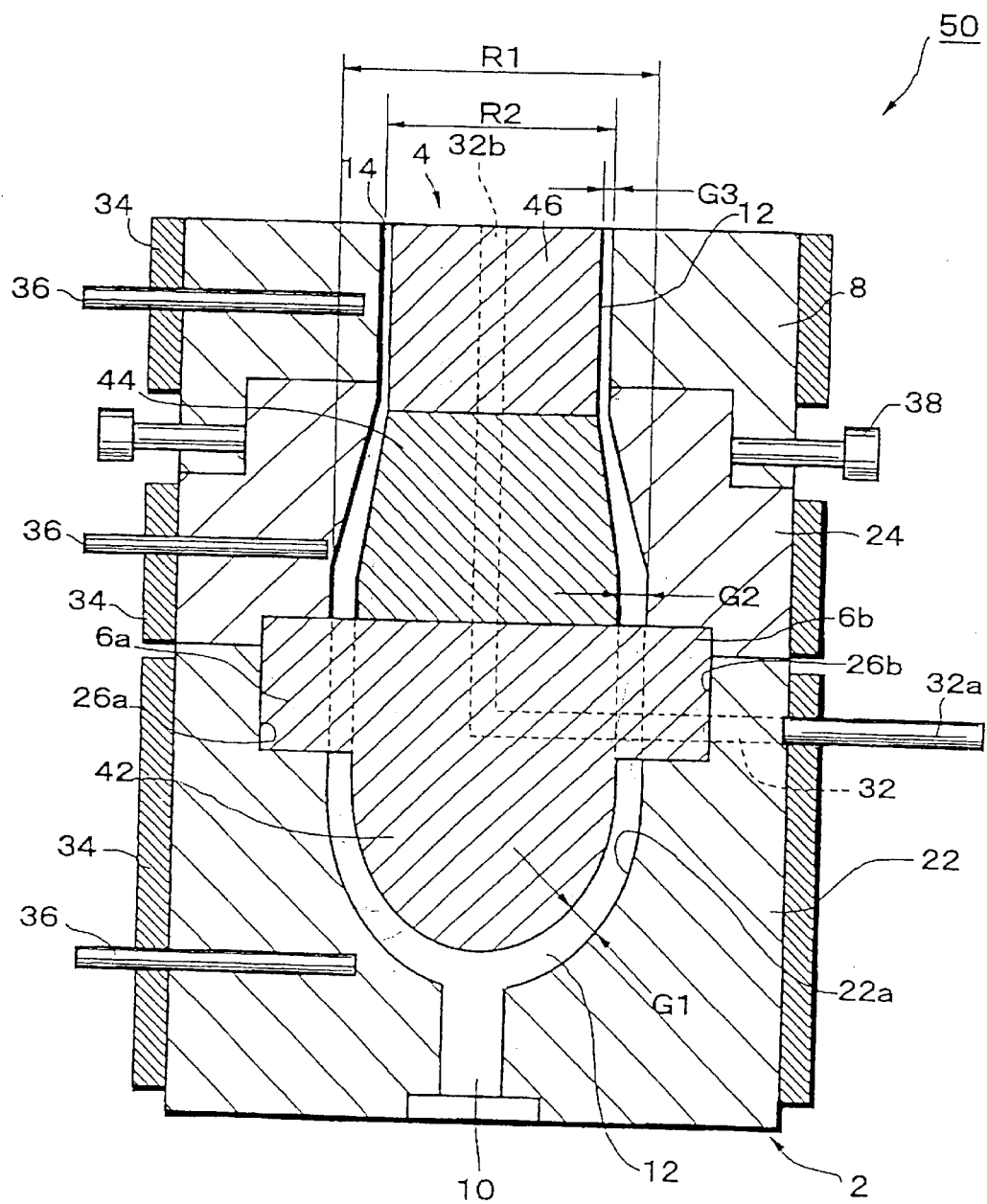
FIG. 1 is a longitudinal sectional view showing one practical embodiment of a blow molding die of the present invention.

In the present invention constituted as described above, when a resin flows from a rein inlet part toward a resin outlet part of an annular resin flow route, the resin branches at the supporting means on the way, however, since the total maximum horizontal cross section of the plurality of supporting means in the resin flow route is one-fifth or less of the horizontal cross section of the resin flow route at any placing position of the plurality of supporting means as described above, influence by branching of the resin at the supporting means is restricted to minimum, branched resins merge quickly, and the resin is extruded to form cylindrical resin through the resin outlet part under the condition that resin flow is approximately uniform along peripheral direction. By this, weld line and unevenness in thickness occurring in the resulted film are reduced, leading to excellent appearance of the film. Further, since unevenness in thickness of the film is reduced, tensile strength along transverse direction of the film increases, and properties of the film are improved.

Further, since a spiral die is dispensable, necessity to form spiral projections on the surface of a mandrel disappear and dimension of a supporting means decreases or the number of the supporting means decreases as compared with a conventional spider die, therefore, a blow molding die is easily produced. Moreover, since no spiral projection is formed, resin flow route becomes simple, and such crisis that a thermoplastic resin manifesting anisotropy in molten state of which melt viscosity significantly depends on shearing speed stagnates and forms an undesirable substance which damages film appearance is reduced.

In the above-described blow molding die, the number of supporting means is preferably two, and these two supporting means are placed opposing each other on a line passing through the central axis of the mandrel. By this, structure of the blow molding die becomes simple, and the die is produced more easily.

Preferably, resin flow route has a flow route part having horizontal cross sections decreasing toward the resin outlet part, at the flow route part of the resin outlet part side from the plurality of supporting means. By this, resin pressure increases at position on the resin outlet part side of the supporting means, therefore, resins branched at the supporting means merge quickly and resin flow becomes more uniform along peripheral direction.

In this case, preferably, the horizontal cross section of the resin flow route at the resin outlet part is from $\frac{1}{15}$ to $\frac{1}{2}$ of the horizontal cross section of the resin flow route at just upper adjacent part of the supporting means. By this, resin pressure increases quicker at position on the resin outlet part side of the supporting means, therefore, resins branched at the supporting means merge quickly and resin pressure does not increase too much to destruct the supporting means.

Further, preferably, the vertical sectional form of the supporting means is streamline. By this, resistance which a resin receives when the resin flows around the supporting means decreases, and the resin flows relatively smooth, therefore, also because of such reasons, resins branched at supporting means merge quickly and resin flow becomes more uniform along peripheral direction.

Also, the present invention provides a method for producing a film made of a thermoplastic resin which manifests anisotropy in molten state, wherein the thermoplastic resin which manifests anisotropy in molten state is extruded through the above-described blow molding die, an air is blown through the aeration route into the resulting cylindrical resin to expand the resin, and this expanded resin is flattened and wound up.

By producing a film made of a thermoplastic resin which manifests anisotropy in molten state using the above-described blow molding die, weld line, unevenness in thickness and the like are reduced as described above, consequently, a film is obtained having excellent properties and appearance.

A practical embodiment of the present invention will be illustrated below referring to drawings.

FIG. 1 is a longitudinal sectional view showing one practical embodiment of a blow molding die according to the present invention. In this drawing, a blow molding die 50 comprises a cylindrical die body 2 having a hollow portion, a cylindrical movable ring 8 having a hollow portion mounted separably on the upper surface of this die body 2, a mandrel 4 placed coaxially with the die body 2 and the movable ring 8 in hollow portions of the die body 2 and the movable ring 8, and two supporting means 6a, 6b which are placed in gap between the die body 2 and the mandrel 4 and support the mandrel 4 on the die body. The inner surfaces of the die body 2 and the movable ring 8 and the surface of the mandrel 4 are both smooth, and the average roughness (Ra) is preferably 5.0 or less.

The die body 2 is constituted of an outer lower part 22 and an outer upper part 24 mounted separably on the upper side of this outer lower part 22 so that the die 50 is easily assembled or disassembled. The outer lower part 22 has a mandrel insertion part 22a having curved lower portion, and a resin inlet part 10 formed in the lower part of this mandrel insertion part 22a and used for taking a molten resin described below into the die 50. The outer upper part 24 has taper structure in which the inner diameter becomes smaller from the lower part to the upper part.

Figure 2:
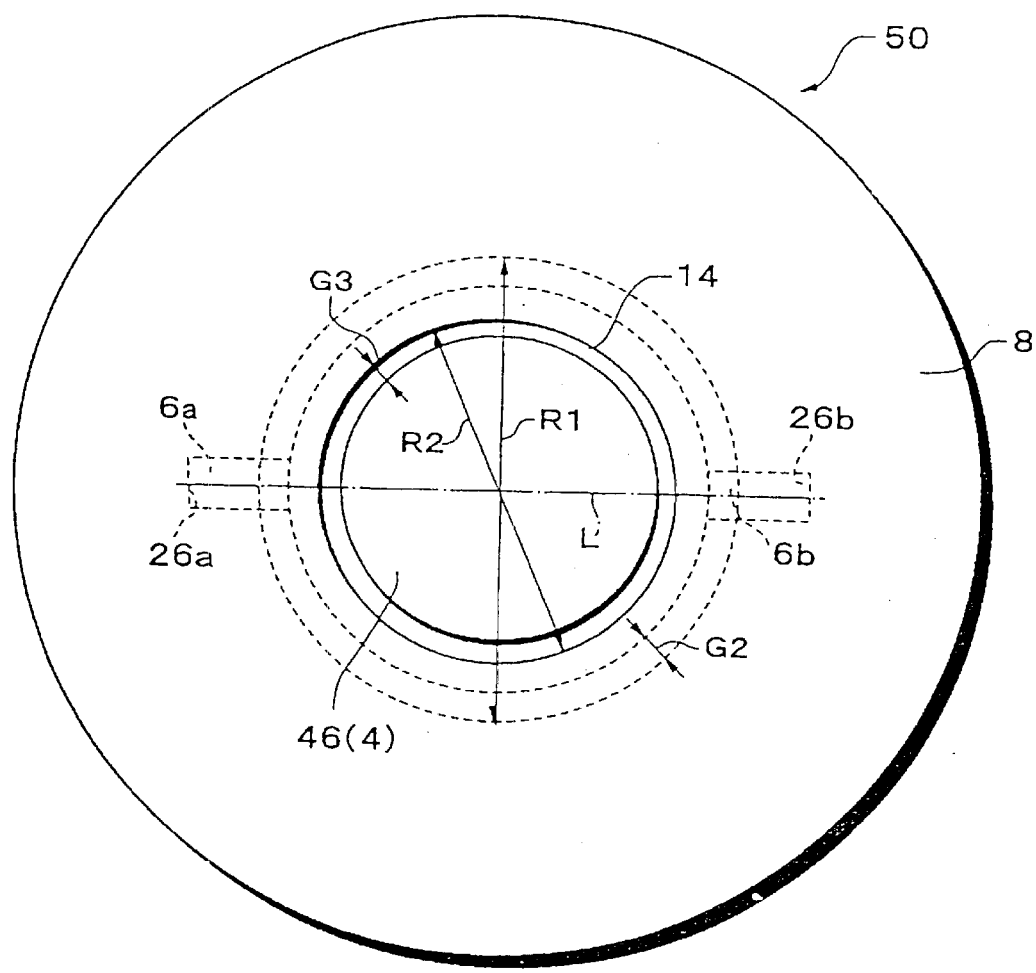
FIG. 2 is a plan view of the blow molding die shown in FIG. 1.

Further, two concaves 26a, 26b for mounting two supporting means 6a, 6b are formed in positions ranging from the upper part of the outer lower part 22 to the lower part of the outer upper part 24. These two concaves 26a, 26b are placed opposing each other on a line L passing through the central axis of the die body 2 as shown in FIG. 2.

The mandrel 4 is constituted of a core lower part 42, a core upper part 44 mounted separably on the upper part of this core lower part 42, and a core land part 46 mounted separably on the upper part of this core upper part 44, so that the die 50 is easily assembled or disassembled like the die body 2. The lower part of the core lower part 42 forms curve corresponding to the mandrel insertion part 22a of the outer lower part 22.

Two supporting means 6a, 6b are integrated and fixed at the same height on the upper side face of the core lower part 42. These supporting means 6a, 6b are placed opposing each other on a line L passing through the center of the mandrel 4 corresponding to the concaves 26a, 26b formed on the die body 2 as shown in FIG. 2. The supporting means 6a, 6b are inserted respectively into the concaves 26a, 26b and fixed to the die body 2 by bolts and the like.

Figure 3:
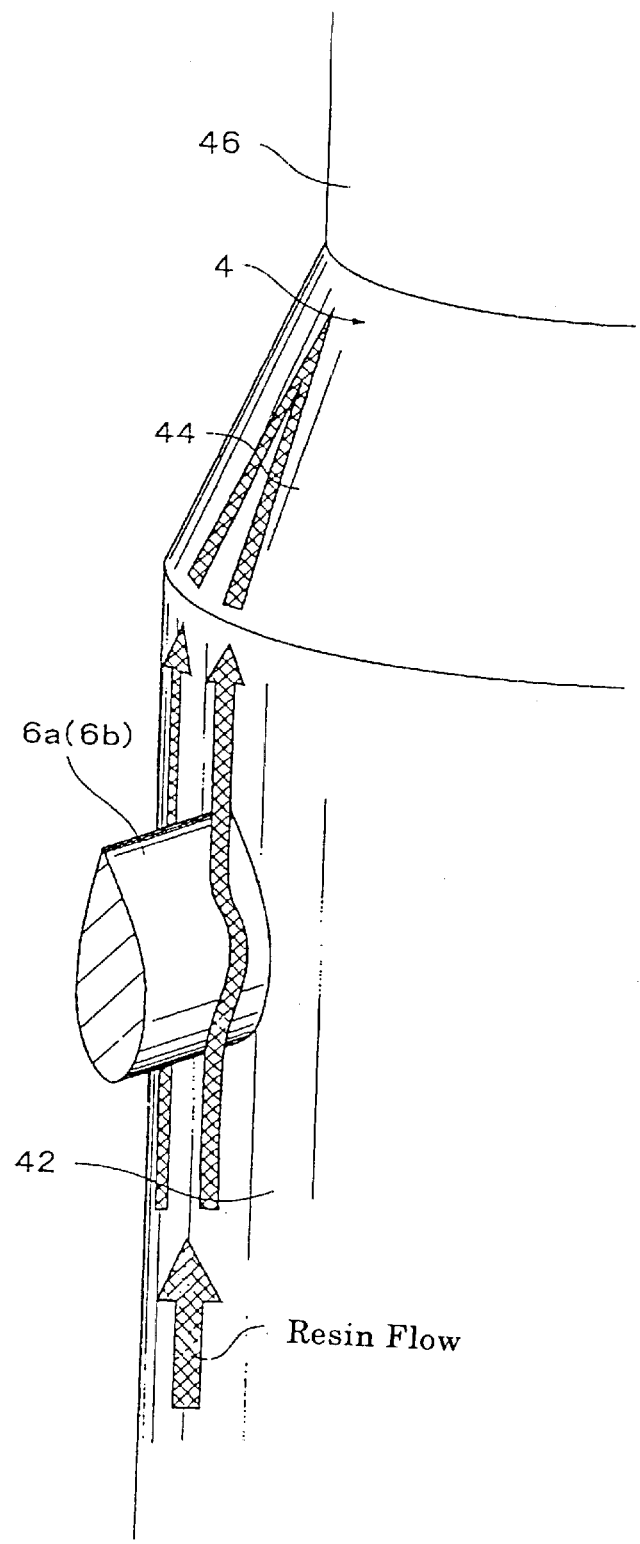
FIG. 3 is a perspective view showing sectional form of the supporting means and flow of a resin shown in FIG. 1.

Further, as shown in FIG. 3, the supporting means 6a, 6b have vertical sections in the form of streamline. The streamline herein referred to means form which fluid (molten resin in this case) around it flows smoothly and resistance of the fluid is low, and include not only curved forms but also forms containing straight line parts.

The supporting means 6a, 6b have been described to be integrated and fixed to the core lower part 42, however, it may also be permissible for example that concaves are formed opposing each other on the inner surface of the die body 2 and the outer surface of the mandrel 4 respectively, supporting means are inserted in respective concaves, and the supporting means are fixed to the die body 2 and the mandrel 4 respectively by bolts and the like.

The core upper part 44 has taper structure in which the diameter becomes smaller from the lower part to the upper part corresponding to the outer upper part 24. The diameter of the core land part 46 is approximately constant along vertical direction. Also, the diameter of the movable ring 8 is approximately constant along vertical direction.

Gap between the resin inlet part 10 placed in the outer lower part 22 of the die body 10, the die body 2 and the mandrel 4 and gap between the movable ring 8 and the mandrel 4 form a resin flow route 12 for passing a molten resin from the lower end to the upper end in the die 50.

In this resin flow route 12, gap between the outer upper part 24 of the die body 2 and the core upper part 44 of the mandrel 4 forms structure which tapers steeply. Gap between the movable ring 8 and the core land part 46 of the mandrel 4 is approximately constant.

When gap of the resin flow route 12 at given position of the lower part of the mandrel 4 is named G1, gap of the resin flow route 12 at just upper adjacent part of the supporting means 6a, 6b is named G2 and gap of the resin flow route 12 at the resin outlet part 14 is named G3, there is a relation that G1>G2>G3, and by this relation, resin pressure can increase in the die 50. Further, the horizontal cross section of the resin flow route 12 at the resin outlet part 14 is about 1/7 of the horizontal cross section of the resin flow part 12 at the just upper adjacent part of the supporting means 6a, 6b, therefore, resin pressure does not increase excessively to destruct the supporting means 6a, 6b.

The total horizontal cross section at the resin flow route of the supporting means 6a, 6b at the height position wherein the width of the supporting means 6a, 6b is maximum is about 1/12 of the horizontal cross section of the resin flow route 12 at the same height position. By this ratio, the supporting means 6a, 6b can surely support the mandrel 4 on the die body 2 and can fully stand force applied by resin flow.

Further, the blow molding die 50 comprises an air introducing tube (aeration route) for passing through air to expand cylindrical resin extruded through the resin outlet part 14 of the resin flow route 12, a plurality of thermocouples 36 which are inserted into bored holes formed in the die body 2 and the movable ring 8 and measures temperatures of the die body 2 and the movable ring 8, a heater band 34 which covers the outer surfaces of the die body 2 and the movable ring 8 and heats the resin flowing in the resin flow route 12 so that the resin is kept in molten state based on temperatures measured by the thermocouples 36, and a plurality of regulation bolts 38 which are mounted on the movable ring 8 and apply suitable force to the outer upper part 24 of the die body 2 for controlling and improving unevenness in thickness of the resulting film (described below).

The air introducing tube 32 extends in the outer lower part 22 of the die body 2, the supporting means 6b and the core lower part 42 of the mandrel 4 toward the center axis of the mandrel 4, bends toward upper direction at the position of the central axis of the mandrel 4, and extends up to the upper end of the mandrel 4 to form an air blow outlet 32. The air introducing tube 32 is connected to an outer air introducing tuber 32a, air from the outer air introducing tuber 32a is introduced in the air introducing tube 32 and blown through the air blow outlet 32b into cylindrical resin extruded above the mandrel 4 to expand the resin.

In this example, air is blown into cylindrical resin, however, it may also be permissible that nitrogen, hydrogen, oxygen, argon, helium or mixed gases thereof are introduced according to objects instead of air.

Figure 4:
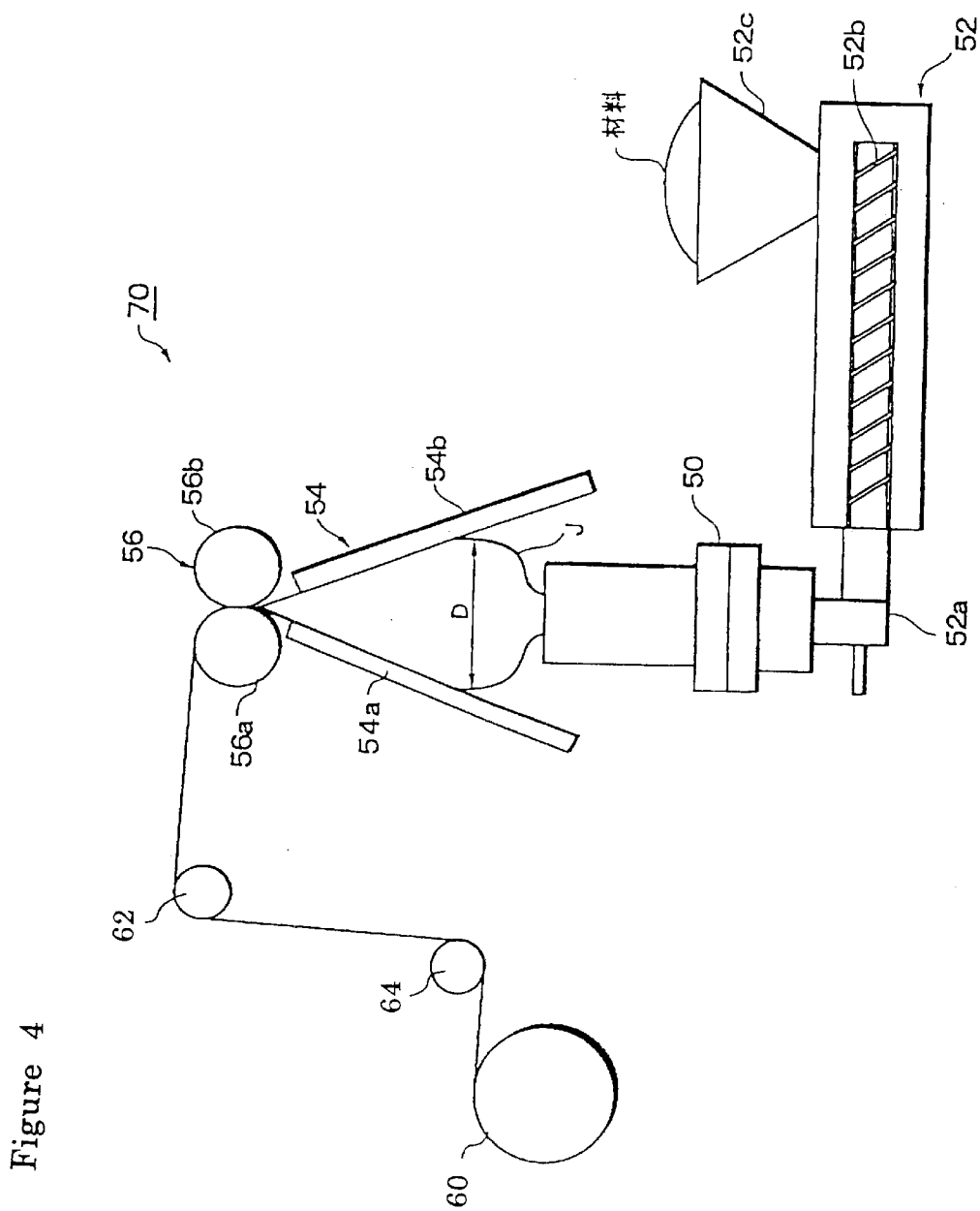
FIG. 4 is a constitutional view of a blow molding apparatus equipped with the blow molding die shown in FIG. 1.

FIG. 4 is a constitution view showing a blow molding apparatus comprising the above-described blow molding die 50. The blow molding apparatus 70 comprises an extruder 52 having a thermostat equipment, guide plates 54a, 54b, a pinch roll 56 and a winder 60, in addition the blow molding die 50.

The extruder 52 has a screw 52b rotated by an actuator 52a, and a thermostat not shown, and by using the screw 52b and the thermostat, a resin in the form of solid particles stored in a hopper 52c is heated to make uniform molten state and the molten resin is transferred into the blow molding die 50.

The guide plate 54 is constituted of two plates 54a, 54b which a placed to form Japanese Ha character against the blow molding die 50, and makes cylindrical resin J which has been extruded from the blow molding die 50 and expanded by air flat.

The pinch roll 56 is composed of a metal roll 56a and a rubber roll 56b, and takes over continuously the resin flattened by the guide plate 54. The winder 60 winds up the resin transferred continuously via guide rolls 62, 64 from the pinch roll 56.

A resin used in blown film forming by the blow molding apparatus 70 will be described below.

The thermoplastic resin manifesting anisotropy is a molten type liquid crystal (thermotropic liquid crystal) polymer, preferably a liquid crystal polyester.

Concrete examples are those forming anisotropic melt at temperatures of not higher than 400° C. and include:

(1) a combination of an aromatic dicarboxylic acid, an aromatic diol, and an aromatic hydroxycarboxylic acid;

(2) a combination of different aromatic hydroxycarboxylic acids;

(3) a combination of an aromatic dicarboxylic acid; and (4) a resultant obtained by making polyester, such as polyethylene terephthalate with an aromatic hydroxycarboxylic acid.

The aromatic dicarboxylic acid, the aromatic diol, and the aromatic hydroxycarboxylic acid may be replaced by their ester forming derivatives.

The repeating unit of the liquid-crystal polyester may be (1) a repeating unit derived from an aromatic dicarboxylic acid, (2) a repeating unit derived from an aromatic diol, and (3) a repeating unit derived from an aromatic hydroxycarboxylic acid given below, although not being restricted to these structures.

(1) Repeating Unit Derived from an Aromatic Dicarboxylic Acid (2) Repeating Unit Derived from an Aromatic Diol (3) Repeating Unit Derived from an Aromatic Hydroxycarboxylic Acid

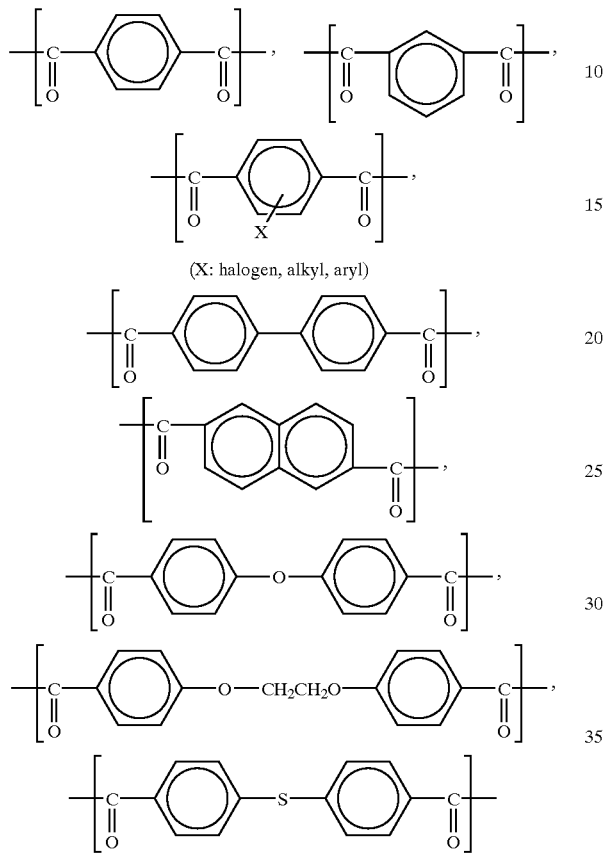

(X: halogen, alkyl, aryl)

(X': halogen, alkyl)

The favorable liquid-crystal polyester based on the well balance of the heat resistance, the mechanical properties, and the workability preferably includes at least 30% by mole of a repeating unit defined as:

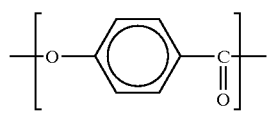

and concretely has a combination of repeating units selected out of the group consisting of (I) through (VI) given below:

(I)
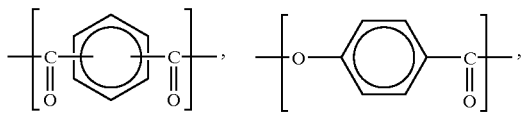
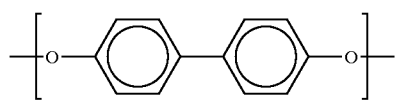

(II)
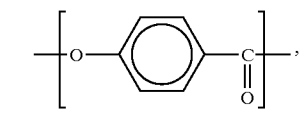
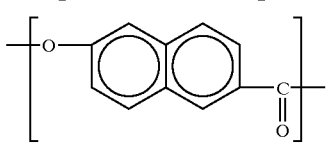

(III)
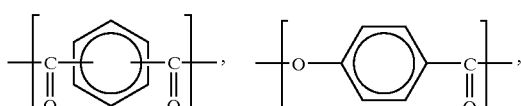
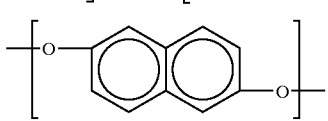

(IV)
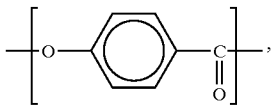
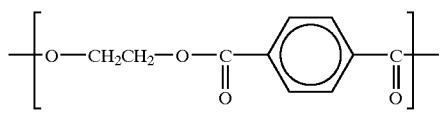

(V)
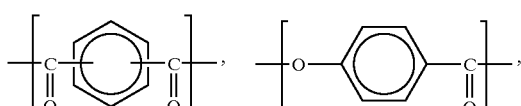
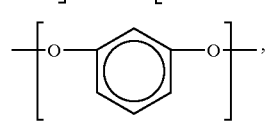
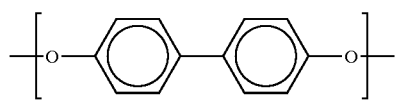

(VI)
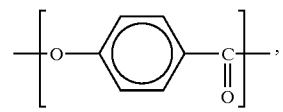
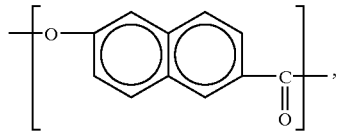
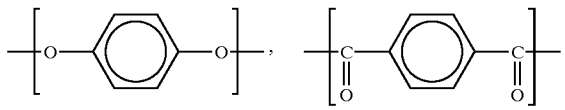

Manufacture of these liquid-crystal polyesters (I) through (VI) are specified in, for example, Japanese Patent KOKOKU Publication Nos. 47-47870, 63-3888, 63-3891, and 56-18016, and Japanese Patent KOKAI Publication No.2-051523. Preferable combinations are (I), (II), and (IV), and the combinations (I) and (II) are more preferable.

In case that the high heat resistance is required for the liquid-crystal polyester resin composition of the present invention, it is preferable that the constituent (A) liquid-crystal polyester includes 30 to 80% by mole of a repeating unit (a'), 0 to 10% by mole of a repeating unit (b'), 10 to 25% by mole of a repeating unit (c'), and 10 to 35% by mole of a repeating unit (d') given below:

(a')
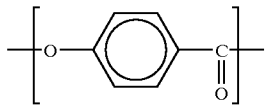

(b')
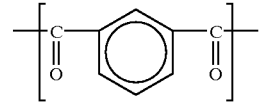

(c')
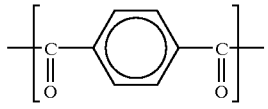

(d')

where Ar denotes a divalent aromatic group.

The thermoplastic resin manifesting anisotropy includes preferably a composition comprising (A) a liquid crystal polyester as a continuos phase and (B) a copolymer having functional group reactive with the liquid crystal polyester as a dispersed phase. From this composition, a film having good flexibility and little unevenness in thickness can be obtained.

The functional group reactive with the liquid-crystal polyester may be an oxazolyl group, an epoxy group, or an amino group, but an epoxy group is preferable. The epoxy group may exist as part of another functional group, such as a glycidyl group.

Examples of the monomer having a functional group reactive with a liquid-crystal polyester include unsaturated glycidyl carboxylates and unsaturated glycidyl ethers.

The unsaturated glycidyl carboxylate is expressed as a general formula given below:

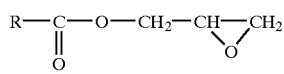

where R denotes a hydrocarbon radical of 2 to 13 carbon atoms having ethylene unsaturated bonding.

The unsaturated glycidyl ether is expressed as a general formula given below:

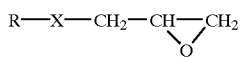

where R denotes a hydrocarbon radical of 2 to 18 carbon atoms having ethylene unsaturated bonding, and X denotes $CH_2$—O—or

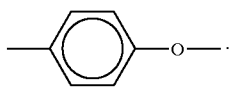

Concrete examples of the unsaturated glycidyl carboxylate include glycidyl acrylate, glycidyl methacrylate, diglycidyl itaconate, triglycidyl butene tricarboxylate, and glycidyl p-styrene carboxylate.

Concrete examples of the unsaturated glycidyl ether include vinyl glycidyl ether, allyl glycidyl ether, 2-methylallyl glycidyl ether, methacryl glycidyl ether, and styrene-p-glycidyl ether.

A preferable example of the rubber (B) having a functional group reactive with the liquid-crystal polyester is (meth)acrylate-ethylene-(unsaturated glycidyl carboxylate and/or unsaturated glycidyl ether) terpolymer rubber.

Examples of the copolymer (B) include a coplymer containing an unsaturated glycidyl ester unit and/or unsaturated glycidyl ether unit in an amount of 0.1–30% by weight.

The above copolymer (B) having a functional group reactive with a polyester may be a thermoplastic resin, a rubber or a mixture thereof. A rubber has a good thermal stability and flexibility, and it is preferable.

Moreover, the above copolymer (B) having a functional group reactive with a polyester has preferably a heat of fusion of less than 3 J/g.

The copolymer (B) has the Mooney viscosity of preferably 3 to 70, more preferably 3 to 30, and most preferably 4 to 25.

The Mooney viscosity is measured at 100° C. with a large rotor according to JIS K6300.

The rubber here corresponds to the polymer substance having rubber elasticity at room temperature as defined in Shinpan Kobunshi Jiten (New Edition of Polymer Dictionary) (compiled by Polymer Society, 1998, Asakura Shoten). Concrete examples of the rubber include natural rubber, butadiene polymers, butadiene-styrene copolymers (including random copolymers, block copolymers (including SEBS rubber or SBS rubber), and graft copolymers) and their hydrogenated rubber, isoprene polymer, chlorobutadiene polymer, butadiene-acrylonitrile copolymer, isobutylene polymer, isobutylene-butadiene copolymer rubber, isobutylene-isoprene copolymer, acrylate-ethylene copolymer rubber, ethylene-propylene copolymer rubber, ethylene-butene copolymer rubber, ethylene-propylene-styrene terpolymer rubber, styrene-isoprene copolymer rubber, styrene-butylene-copolymers, styrene-ethylene-propylene terpolymer rubber, perfluororubber, fluororubber, chloroprene rubber, butyl rubber, silicon rubber, ethylene-propylene-non-conjugated diene terpolymer rubber, thiol rubber, polysulfide rubber, polyurethane rubber, polyether rubber (such as polypropylene oxide), epichlorohydrin rubber, polyester elastomer, and polyamide elastomer. Preferable examples are acrylic rubber, butadiene-styrene copolymer and their hydrogenated rubber, and acrylate-ethylene copolymer, and especially preferable are (meth)acrylate-ethylene copolymer rubber.

These rubber substances may be manufactured in the presence of any catalyst (for example, peroxides, trialkyl aluminums, lithium halides, and nickel catalysts) according to any manufacturing process (for example, emulsion polymerization and solution polymerization).

The rubber of the present invention as a copolymer (B) is one of the above rubbers having a functional group reactive with the liquid-crystal polyester.

The method of introducing the functional group reactive with the liquid-crystal polyester into the rubber (B) of the present invention is not specifically restricted, but any known process is applicable. For example, a monomer having a functional group reactive with the liquid-crystal polyester may be introduced into the rubber by copolymerization in the course of synthesizing the rubber. In another example, the monomer having a functional group reactive with the liquid-crystal polyester may be graft copolymerized with the rubber.

The (meth)acrylate is an ester obtained from acrylic acid or methacrylic acid and an alcohol. It is preferable that the alcohol is one of those containing one to eight carbon atoms. Concrete examples of the (meth)acrylate include methyl acrylate, methyl methacrylate, n-butyl acrylate, n-butyl methacrylate, tert-butyl acrylate, tert-butyl methacrylate, 2-ethylhexyl acrylate, and 2-ethylhexyl methacrylate. One or a combination of these examples may be used as the (meth)acrylate.

The copolymer (B) of the present invention having a functional group reactive with the liquid-crystal polyester includes the (meth)acrylate unit of more than 40% by weight and less than 97% by weight or preferably in the range of 45 to 70% by weight, the ethylene unit of not less than 3% by weight and less than 50% by weight or preferably in the range of 10 to 49% by weight, and the unsaturated glycidyl carboxylate and/or unsaturated glycidyl ether unit of 0.1 to 30% by weight or preferably in the range of 0.5 to 20% by weight.

When the components of the copolymer (B) are outside the above range, a film or sheet obtained therefrom may have an inferior thermal or mechanical stability, and it is not preferable.

The above-described copolymer rubber is manufactured by a known process, for example, bulk polymerization with a free-radical initiator, emulsion polymerization, or solution polymerization. A typical polymerization method is that conducted in the presence of a polymerization initiator for producing free radicals under the pressure of not less than 500 kg/cm$^2$ at temperatures of 40 to 300° C. as specified in Japanese Patent KOKOKU Publication No. 46-45085 and Japanese Patent KOKAI Publication No. 61-127709.

As a copolymer (B) in the invention, an acrylic rubber having a functional group reactive with liquid crystal polyester can be also used. The acrylic rubber mainly comprises at least one selected from the group consisting of the monomers represented by the below-mentioned general formulae (1) to (3):

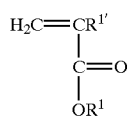

(1)

wherein $R^1$ denotes an alkyl group or a cyano alkyl group having 1 to 18 carbon atoms, and $R^{1'}$ denotes a hydrogen atom or a methyl group;

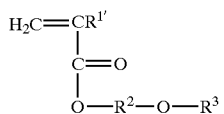

(2)

wherein $R^2$ denotes an alkylene group having 1 to 12 carbon atoms, and $R^3$ denotes an alkyl group having 1 to 12 carbon atoms; and

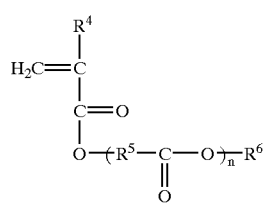

(3)

wherein $R^4$ denotes a hydrogen atom or a methyl group, $R^5$ denotes an alkylene group having 3 to 30 carbon atoms, $R^6$ denotes an alkyl group having 1 to 20 carbon atoms or a derivative thereof, and n denotes an integer from 1 to 20.

Examples of alkyl acrylates represented by the above-mentioned general formula (1) include methyl acrylate, ethyl acrylate, propyl acrylate, butyl acrylate, pentyl acrylate, hexyl acrylate, actyl acrylate, 2-ethyl hexyl acrylate, nonyl acryalte, decyl acrylate, dodecyl acrylate and cyano ethyl acrylate.

Examples of alkoxyalkyl acrylates represented by the above-menitoned general formula (2) include methoxy ethyl acrylate, ethoxy ethyl acrylate, butoxy ethyl acrylate and ethoxy propyl acrylate. One kind or two or more kinds thereof can be used as a main component of the acrylic rubber.

As a component of the acrylic rubber, an unsaturated monomer copolymerizable with at least one selected from the compounds represented by the above-mentioned general formulae (1) to (3) as needed.

Examples of the unsaturated monomers include styrene, α-methyl styrene, acrylonitril, styrene halide, methacrylonitrile, acryl amide, methacryl amide, vinylnaphthalene, N-methylol acryl amide, vinyl acetate, vinyl chloride, vinylidene chloride, benzyl acrylate, methacrylic acid, itaconic acid, fumaric acid and maleic acid.

As the component (B) of the present invention, a vinyl aromatic hydrocarbon compound/conjugated diene compound block copolymer rubber having epoxy group can be used. The copolymer is a rubber obtainable by epoxydating a block copolymer or hydrogenated product thereof, comprising sequences of a vinyl aromatic hydrocarbon compound (a) and sequences of a conjugated diene compound.

The vinyl aromatic hydrocarbon compound/block copolymer and its hydrogenated product can be prepared by conventional method, for example, as described in JP-B-40-23798 and JP-A-59-133203.

Vinyl aromatic hydrocarbon compounds include styrene, vinyl toluene, divinyl benzene, α-methylstyrene, p-methylstyrene and vinylnaphthalene. Among them, styrene is preferable.

Conjugated diene compounds include butadiene, isoprene, piperylene, 1,3-pentadiene and 3-butyl-1,3-octadiene. Among them, butadiene and isoprene are preferable.

Examples of the rubber include a coplymer rubber of (meth)acrylate-ethylene-(unsaturated glycidyl ester and/or unsaturated glycidyl ether)

The rubber can be vulcanized as needed, and can be used as a vulcanized rubber.

Vulcanization can be achieved by the use of a polyfunctional organic acid, a polyfunctional amine compound, or an imidazole compound. But vulcanization methods are not limited thereto.

It is preferable to use an epoxy group-containing ethylene copolymer as the copolymer (B). The epoxy group-containing ethylene copolymer refers to an epoxy group-containing ethylene copolymer comprising: (a) 50 through 99% by weight, preferably 60 through 99% by weight, of an ethylene unit; (b) 0.1 through 30% by weight, preferably 0.5 through 20% by weight, of an unsaturated glycidyl ester unit or an unsaturated glycidyl ether unit; and (c) 0 through 50% by weight of an ethylenically unsaturated ester compound unit.

Examples of ethylenically unsaturated ester compounds (c) include vinyl carboxylates such as vinyl acetate and vinyl propionate, and α, β-unsaturated alkyl carboxylates, such as methyl acrylate, ethyl acrylate, butyl acrylate, methyl methacrylate, ethyl methacrylate, and butyl methacrylate. Vinyl acetate, methyl acrylate, and ethyl acrylate are particularly preferred.

Examples of the epoxy group-containing ethylene copolymers include a copolymer comprising ethylene units and glycidyl methacrylate units, a copolymer comprising ethylene units, glycidyl methacrylate units and methyl acrylate units, a copolymer comprising ethylene units, glycidyl methacrylate units and ethyl acrylate units, a copolymer comprising ethylene units, glycidyl methacrylate units and vinyl acetate units, and the like.

The melt index (hereinafter may be referred to as MFR: measured at 190° C. under a load of 2.16 kg in conformity with JIS K6760) of the epoxy group-containing ethylene copolymer is preferably in a range of 0.5 through 100 g/10 minutes and more preferably in a range of 2 through 50 g/10 minutes. The melt index outside the range is allowable but the index greater than 100 g/10 minutes results in poor mechanical properties of the resulting resin composition while that less than 0.5 g/10 minutes lowers the compatibility with the liquid crystal polyester of component (A) and therefore both cases are not preferred.

The epoxy group-containing ethylene copolymer preferably has stiffness modulus in a range of 10 through 1300 kg/cm$^2$ and more preferably in a range of 20 through 1100 kg/cm$^2$. The stiffness modulus out of the above range is not preferred because it may result in insufficient film-molding processibility of the resulting resin composition.

The epoxy group-containing ethylene copolymer (B) is prepared by copolymerizing an unsaturated epoxy compound and ethylene in the presence of a radical polymerization initiator at 500 through 4000 atm and 100 through 300° C. in the presence or absence of an appropriate solvent and a chain transfer agent. Alternatively, it may be produced by mixing polyethylene with an unsaturated epoxy compound and radical polymerization initiator and then melt-graft-copolymerizing in an extruder.

In the liquid crystal polyester resin composition, the liquid crystal polyester constitutes the continuous phase and the thermoplastic resin having a functional group reactive with a polyester constitutes the disperse phase. Constitution of the continuous phase by the thermoplastic resin is not preferred because gas-barrier and heat resistant properties are deteriorated.

One embodiment of the composition of the liquid crystal polyester comprises: (A) 56.0 through 99.9% by weight, preferably 65.0 through 99.9% by weight, more preferably 70 through 98% by weight of a liquid crystal polyester; and (B) 44.0 through 0.1% by weight, preferably 35.0 through 0.1% by weight, and more preferably 30 through 0% by weight of a copolymer having a functional group reactive with a polyester.

When the component (A) is less than 56.0% by weight, gas barrier or heat resistant properties of the molded articles such as a film or sheet obtained from the above composition sometimes lowered. When the component (A) is more than 99.9% by weight, processability sometimes becomes inferior, and it is not preferable.

The method for producing a blown film of a thermoplastic resin which manifests anisotropy in molten state using the blow molding apparatus 70 shown in FIG. 4 will be further explained.

First, the screw 52b is rotated by controlling the actuator 52a of the extruder 52 to make a resin in the form of solid particles stored in the hopper 52c into molten state and the molten resin is transferred into the blow molding die 50.

The melt kneaded resin is taken in through the resin inlet part 10 of the die 50, and flows through the annular resin flow route 12 toward the upper part of the die 50. In this case, the molten resin flowing through parts where the supporting means 6a, 6b thrust branches once due to existence of the supporting means 6a, 6b and merge thereafter and is extruded through the resin outlet part 14 to form cylindrical resin as shown in FIG. 3.

Then, a given amount of air introduced via the air introducing tube is blown in this cylindrical resin to expand the resin, and this expanded resin J is flattened by the guide plate 54. This flat resin is taken over by the pinch roll 56, then transferred to the winder 60 via the guide rolls 62, 64, and wound up continuously by this winder 58. By this procedure, a tubular film is formed.

In this case, if the diameter of a resin after expanded with air is named D, blow ratio BR (=D/R2) of a film is preferably from 1.2 to 6.0. It is preferable that winding speed of a film by the pinch roll 56 is from 1 m/min to 100 m/min. Further, the thickness of a film can be regulated by controlling suitably blow ratio and film winding speed, and preferably from 3 to 1000 $\mu$m, and further preferably from 3 to 500 $\mu$m, In this practical embodiment constituted as described above, when a molten resin flows through the resin flow route 12 in the die 50, the resin branches at the supporting means 5a, 5b on the way, however the total horizontal cross section at the resin flow route 12 of the supporting means 6a, 6b at the height position wherein the width of the supporting means 6a, 6b is maximum is about 1/12 of the horizontal cross section of the resin flow route 12 at the same height position, namely, the ratio of the supporting means 6a, 6b occupying the resin flow route 12 is relatively small, therefore, influence by branching of the resin is restricted to minimum. Further, since the vertical sectional form of the supporting means 6a, 6b is streamline, resistance which a resin receives is small and the resin flows relatively smooth. Further, gap between the outer upper part 24 of the die body 2 and the core upper part 44 of the mandrel 4 tapers and simultaneously the inner diameter of the outer upper part 24 of the die body 2 decreases gradually from the lower part to the upper part, therefore, when a molten resin flows above the supporting means 6a, 6b, resin pressure increases steeply, and accordingly, molten resin flow stagnates. As described above, even if the molten resin flowing in the resin flow route 12 branches at the supporting means 6a, 6b, the branched resins merge quickly above the supporting means 6a, 6b. Further, when the molten resin passes through gap between the movable ring 8 and the core land part 46, rectification action occurs on the molten resin.

Accordingly, cylindrical resin is extruded from the resin outlet part 14 under condition wherein molten resin flow is uniform along peripheral direction, by this, weld line, unevenness in thickness and existence of fine particles occurring in a film finally obtained are reduced, leading to a film having excellent appearance. Since unevenness in thickness is thus reduced, tensile strength along transverse direction of a film increases, and as a result, properties of the film are improved.

In this case, the horizontal cross section of the resin flow route 12 at the resin outlet part 14 is about 1/7 of the horizontal cross section of the resin flow part 12 at the just upper adjacent part of the supporting means 6a, 6b, therefore, resin pressure does not increase excessively to destruct the supporting means 6a, 6b.

Further, since a spiral die is dispensable, necessity to form spiral projections on the surface of a mandrel disappear and since the number of the supporting means is two, the number of grooves formed on the die body 2 for installing the supporting means is as low as two. By this, structure of the blow molding die 50 is simple, the die 50 is produced easily, and cost of the die 50 itself can be significantly reduced. Moreover, since no spiral projection is formed, resin flow route becomes simple, and such crisis that a thermoplastic resin manifesting anisotropy in molten state of which melt viscosity significantly depends on shearing speed such as a liquid crystal polyester used in this practical embodiment stagnates and forms a foreign material degrading film appearance is reduced.

Further, a thermoplastic resin manifesting anisotropy in molten state has low viscosity and flows easily, therefore, the resin can be allowed to flow through the resin flow route 12 at lower pressure. By this reason, even if the ratio of the supporting means 6a, 6b occupying the resin flow route 12 is relatively small as described above, the supporting means 6a, 6b can surely support the mandrel 4 on the die body 2 and can fully stand force applied by resin flow. When a resin such as polyethylene, polypropylene and the like is going to be subjected to blown film forming using the blow molding die 50 as described above, since a resin such as polyethylene, polypropylene and the like has higher viscosity as compared with a liquid crystal polyester, this resin has to be passed through the resin flow route 12 at higher pressure, and in this case, it is impossible to support the mandrel 4 on the die body 2 by the above-described two supporting means 6a, 6b in the view point of strength.

In the blow molding die 50 of the present practical embodiment, the mandrel 4 is supported to the die body 2 by two supporting means 6a, 6b and simultaneously the supporting means 6a, 6b are placed opposing each other on a liner L passing through the central axis of the mandrel 4, however, the number of the supporting means may also be 3 or more. In this case, when the total maximum horizontal cross section of plurality of supporting means in the resin flow route 12 is one-fifth or less of the horizontal cross section of the resin flow route 12 at any placing position of the plurality of supporting means, plurality of supporting means may be placed at any position of the annular rein flow route 12 and plurality of supporting means may be placed at double-level positions. In this case, for restricting influence by plurality of supporting means to minimum while fully standing force applied by resin flow, it is particularly preferable that the total maximum horizontal cross section of plurality of supporting means in the resin flow route 12 is from 1/30 to 1/10 of the horizontal cross section of the resin flow route 12 at any placing position of the plurality of supporting means.

In this practical embodiment, the horizontal cross section of the resin flow route 12 at the resin outlet part 14 is about 1/7 of the horizontal cross section of the resin flow part 12 at the just upper adjacent part of the supporting means 6a, 6b, however, the ratio of the horizontal cross section of the resin flow route 12 is not restricted to this, the horizontal cross section of the resin flow route 12 at the resin outlet part 14 may be smaller than or the same as the horizontal cross section of the resin flow part 12 at the just upper adjacent part of the supporting means 6a, 6b. In this case, for allowing resins branched at the supporting means 6a, 6b to merge quickly while suppressing resin pressure so that it does not increase excessively, the horizontal cross section of the resin flow route 12 at the resin outlet part 14 is preferably from 1/50 to 1/1.2, more preferably from 1/20 to 1/1.5, most preferably from 1/15 to 1/2 of the horizontal cross section of the resin flow part 12 at the just upper adjacent part of the supporting means 6a, 6b.

Further, in this embodiment, the inner diameter of the outer upper part 24 of the die body 2 decreases from the lower part to the upper part, however, the inner diameter may increase or be constant from the lower part to the upper part providing gap G3 in the resin flow route 12 at the resin outlet part 14 is smaller sufficiently as compared with gap G2 in the resin route 12 at just upper adjacent part of the supporting means 6a, 6b.

The inner diameter of the movable ring 8 and the outer diameter of the core land part 46 are both approximately constant from the lower part to the upper part in this embodiment, however, these may vary from the lower part to the upper part. Also in some occasions, the movable ring 8 and core land part 46 may be dispensable.

The vertical cross section of the supporting means is stream line in this embodiment, however, the vertical cross section of the supporting means is not restricted to this, and may be circle, ellipse and the like.

The blow molding die 50 as described above takes in a molten resin from the lower end and extrudes the resin to form cylindrical resin from the upper end, however, the present invention is not restricted to this embodiment and can be applied to a blow molding die which takes in a molten resin from the upper end and extrudes the resin to form cylindrical resin from the lower end.

One embodiment of the present invention will be described below.

Reference Example 1

(1) Production of Component (A), Liquid Crystal Polyester 8.3 kg (60 mol) of p-acetoxybenzoic acid, 2.49 kg (15 mol) of terephthalic acid, 0.83 kg (5 mol) of isophthalic acid and 5.45 kg (20.2 mol) of 4,4'-diacetoxydiphenyl were charged into a polymerization vessel equipped with a comb like stirring blade, the mixture was heated under nitrogen gas atmosphere with stirring and allowed to polymerize at 330° C. An acetic acid gas by-produced during this procedure is liquefied in a cooling tube, recovered and removed, while the mixture was polymerized under vigorous stirring.

Then, the system was cooled gradually, a polymer obtained at 200° C. was removed out of the system. This resulted polymer was ground with a hammer mill manufactured by Hosokawa Micron Corp. to obtain a particle having a particle size of 2.5 mm or less. This particle was further treated at 280° C. for 3 hours under nitrogen atmosphere in a rotary kiln to obtain a whole aromatic polyester in the form of a particle composed of repeating structural units as described below having a flow initiation temperature of 324° C.

The flow initiation temperature herein referred to a temperature at which melt viscosity when a resin heated at a heating speed of 4° C./min. is extruded through a nozzle having an inner diameter of 1 mm and a length of 10 mm under a load of 100 kgf/cm² shows 48000 poise, using a flow tester CFT-500 type manufactured by Shimadzu Corp.

Hereinafter, this liquid crystal polyester is abbreviated as A-1. This polymer revealed optical anisotropy at a temperature of 340° C. or more under pressure. The repeating structural units of the liquid crystal polyester A-1 is as follows.

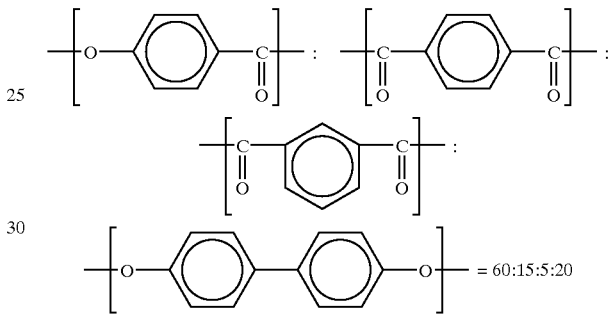

(2) Production of Component (b) Rubber

According to the description of Example 5 of Japanese Patent Application Laid-Open (JP-A) No.61-127709, rubber was obtained which has a methyl acrylate/ethylene/glycidyl methacrylate ratio of 59.0/38.7/2.3 (by weight), a Mooney viscosity of 15 and a dissolution calorie of the crystal of less than 1 J/g. Hereinafter, this rubber is abbreviated as B-1.

The Mooney viscosity herein referred to is a value measured according to JIS K6300 at 100° C. using a large roller. The dissolution calorie of the crystal was measured by heating the sample from –150° C. to 100° C. at a rate of 20° C./min. using DSC-50 manufactured by Shimadzu Corp.

Reference Example 2

Melt kneading was conducted at a cylinder set temperature of 340° C. and a screw rotation of 200 rpm using TEX-30 type twin screw extruder manufactured by Japan Steel Works. Ltd., while feeding A-1 from a main feed and B-1 from a side feed heated at 150° C., to obtain a composition pellet composed of 80% by weight of A-1 and 20% by weight of B-1. This pellet is abbreviated as C-1. This C-1 revealed optical anisotropy at 340° C or more under pressure. The flow initiation temperature of C-1 was 328° C.

In film forming, C-1 was dried for 2 hours at 120° C. to make water content to 0.01% by weight or less. The measurement of the water content (% by weight) was conducted using a quick moisture/solid content measuring apparatus (Computrac Moisture Analyser MAX-2000 type, manufactured by Arizona Instrument Co., Ltd.).

EXAMPLE

In the blow molding die 50 of the present invention as shown in FIG. 1, the inner diameter R1 of the lower part of the outer upper part 24 of the die body 2 is 95 mm, the inner diameter R2 of the upper part of the outer upper part 24 is 70 mm, gap G2 of the resin flow route 12 at the upper part of the supporting means 6a, 6b is 3 mm, and gap G3 of the resin flow route 12 at the resin outlet part 14 is 1 mm. Further, sectional form of the supporting means 6a, 6b is streamline having a vertical diameter of 35 mm and a horizontal diameter of 8 mm. This blow molding die 50 was connected to a single screw extruder of 60 mm, and C-1 obtained in the reference example was extruded at a rate of 40 Kg/hr and an blown film was produced under conditions of a blow ratio of 2.5 and a draw down ration of 10. As a result, the thickness of the resulting film dispersed from 38 to 43 μm, and unevenness in thickness was relatively small. No particle of 200 μm or more was found, and weld line was scarcely recognized in the resulted film.

Comparative Example

Figure 8:
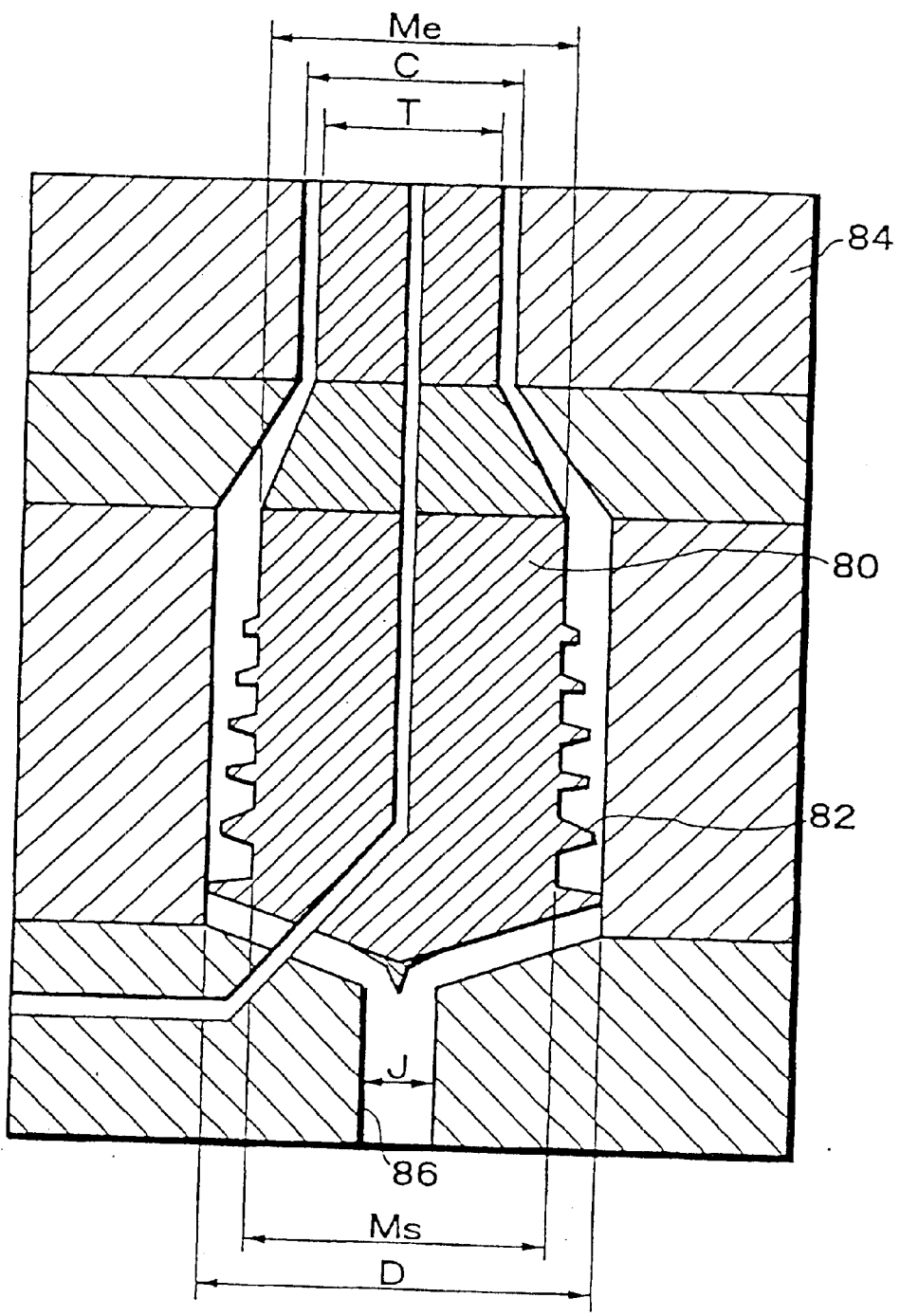
FIG. 8 is a longitudinal view showing a blow molding die used for comparison with the present invention.

In a spiral type blow molding die as shown in FIG. 8, the number of spiral projections 82 formed around whole periphery of a mandrel 80 is eight, the inner diameter D of a die body 84 at position opposing the spiral projection 82 is 100 mm, the outer diameter Ms of the mandrel 80 at initiation position of the spiral projection 82 is 84 mm (distance between the die body 84 and the mandrel 80 is 8 mm), the inner diameter J of a resin inlet part 86 is 20 mm, the outer diameter Me of the mandrel at final position of the spiral projection 82 is 88 mm (distance between the die body 84 and the mandrel 80 is 6 mm), the outer diameter T at top portion of the mandrel 80 is 48 mm, and the inner diameter C at the top portion of the die body 84 is 50 mm. This blow molding die was connected to a single screw extruder of 60 mm, and C-1 obtained in the reference example was extruded at a rate of 40 Kg/hr and an blown film was produced under conditions of a blow ratio of 2.5 and a draw down ration of 10. As a result, the thickness of the resulting film dispersed from 30 to 49 μm, and unevenness in thickness was larger as compared with the above-described example. In the resulted film, particles of 500 μm or more were found in a number of about 5 on average per 1 m², and weld line occurred remarkably.

By utilizing the above described die and basically the same molding condition, a film having no weld line, uneveness in thickness and the like can be obtained.

In the method, a molten resin is extruded to form cylindrical resin from a blow molding die, air is blown into this cylindrical resin for expanding the resin to obtain a tubular film, the tubular film is flattened by a pair of guide plates placed opposing each other so that they form taper toward extrusion direction of the resin, both edge portions of this tubular film are cut to prepare two films, and these films are respectively wound up;

wherein as the blow molding die, a die which comprises a die body having a hollow portion, a mandrel placed in the hollow portion of the die body, a plurality of supporting means which are placed in an annular resin flow route formed in gap between the die body and the mandrel and support the mandrel on the die body and, an aeration route for passing a gas to expand cylindrical resin extruded through a resin outlet part of the resin flow route and in which the plurality of supporting means are placed in one of two pairs of opposing intersecting angle regions formed by two lines passing through the central axis of the mandrel is used, and one pair of the guide plates are placed so that leading end portions of the one pair of guide plates are approximately parallel to a line connecting centers of one of two pairs of opposing intersecting angle regions and the tubular film is flattened.

In the present invention constituted as described above, a plurality of supporting means of a blow molding die are placed in one of two pairs of opposing intersecting angle regions formed by two lines passing through the central axis of the mandrel is used, and one pair of the guide plates are placed so that leading end portions of one pair of the guide plates are approximately parallel to a line connecting centers of one of two pairs of opposing intersecting angle regions, therefore, when a tubular film is flattened by the guide plates, weld line, unevenness in thickness and the like occurring by the influence of the supporting means will be present only in both edge portions. Therefore, by cutting both edge portions of the tubular film, the resulting two films have almost no weld line and unevenness in thickness, leading to excellent appearance of the film. Also, since unevenness in thickness of the film is reduced, tensile strength along transverse direction of the film increases and properties of the film become excellent.

In the above-described method for producing a film, preferably, as the blow molding die, a die in which at least one of the plurality of supporting means is placed in one of opposing intersecting regions at 45° formed by two lines passing through the central line of the mandrel and other supporting means are placed in other opposing intersecting region at 45° is used, and the one pair of guide plates are placed so that leading end portions of the one pair of guide plates are approximately parallel to a line connecting centers of the opposing intersecting regions at 45°.

By this, when a tubular film is flattened by the guide plates, area occupied by weld line, unevenness in thickness and the like occurring both edge portions of the tubular film decrease, therefore, two films of relatively large width having excellent appearance can be produced.

Further, the present invention provides a blow molding die used in forming a blown film from a thermoplastic resin which manifests anisotropy in molten state, wherein the die comprises a die body having a hollow portion, a mandrel placed in the hollow portion of the die body, a plurality of supporting means which are placed in an annular resin flow route formed in gap between the die body and the mandrel and support the mandrel on the die body and an aeration route for passing a gas to expand cylindrical resin extruded through a resin outlet part of the resin flow route, and at least one of the plurality of supporting means is placed in one of opposing intersecting regions at 45° formed by two lines passing through the central line of the mandrel and other supporting means are placed in other opposing intersecting region at 45°.

By this, the method for producing a film as described above can be conducted, and therefore, two films having excellent properties and appearance and having almost no weld line, unevenness in thickness and the like can be produced.

In the above-described blow molding die, preferably, the number of the supporting means is two, and one of these two supporting means is placed in one of the opposing intersecting regions at 45° and another supporting means is placed in other opposing intersecting region at 45°. In this case, it is particularly preferable that the two supporting means are placed opposing each other on a line passing through the central axis of the mandrel. By this, structure of the blow molding die becomes simple and the die can be produced more easily.

Figure 5:
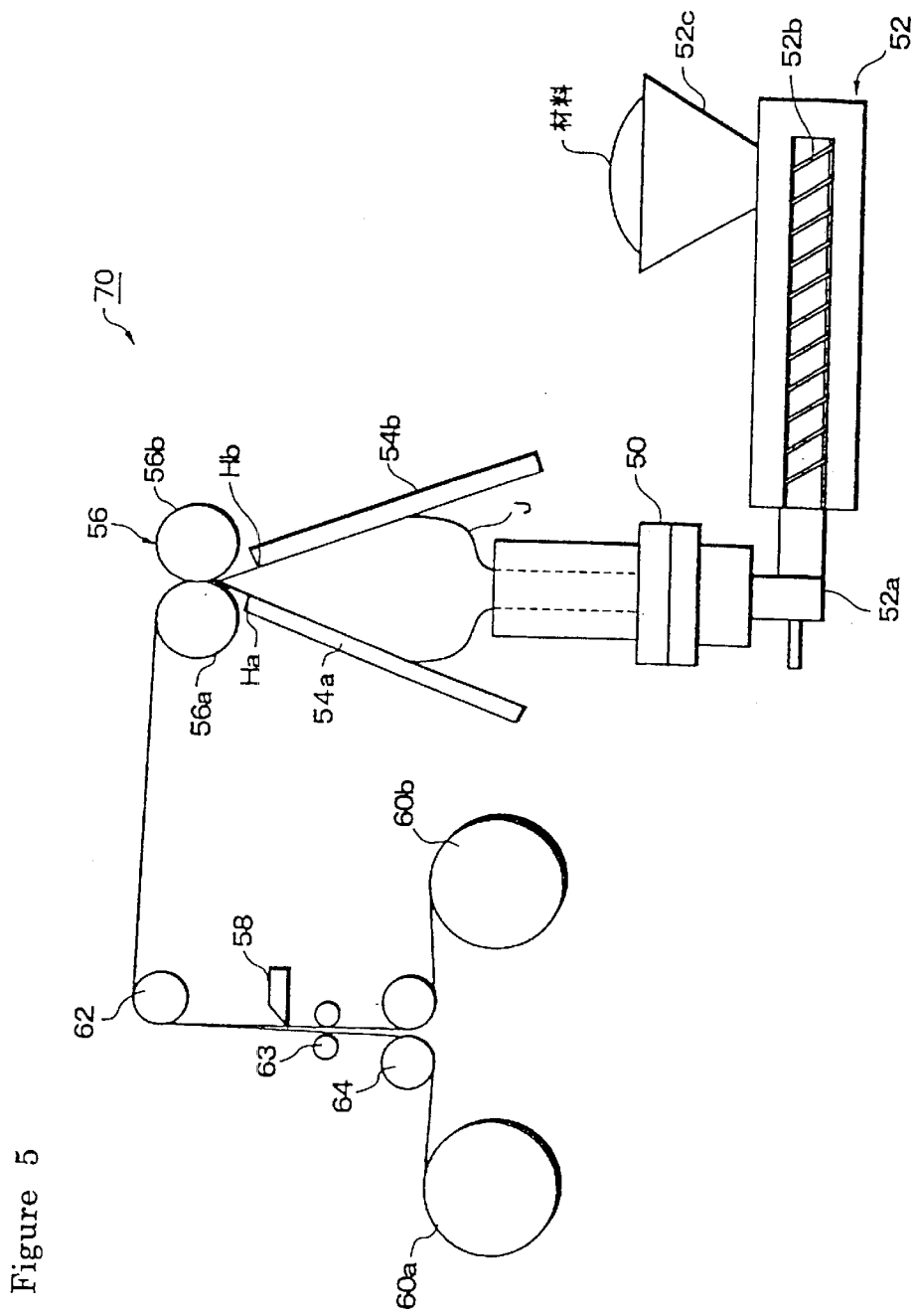
FIG. 5 is a constitutional view of a blow molding apparatus equipped with the blow molding die shown in FIG. 1.
Figure 6:
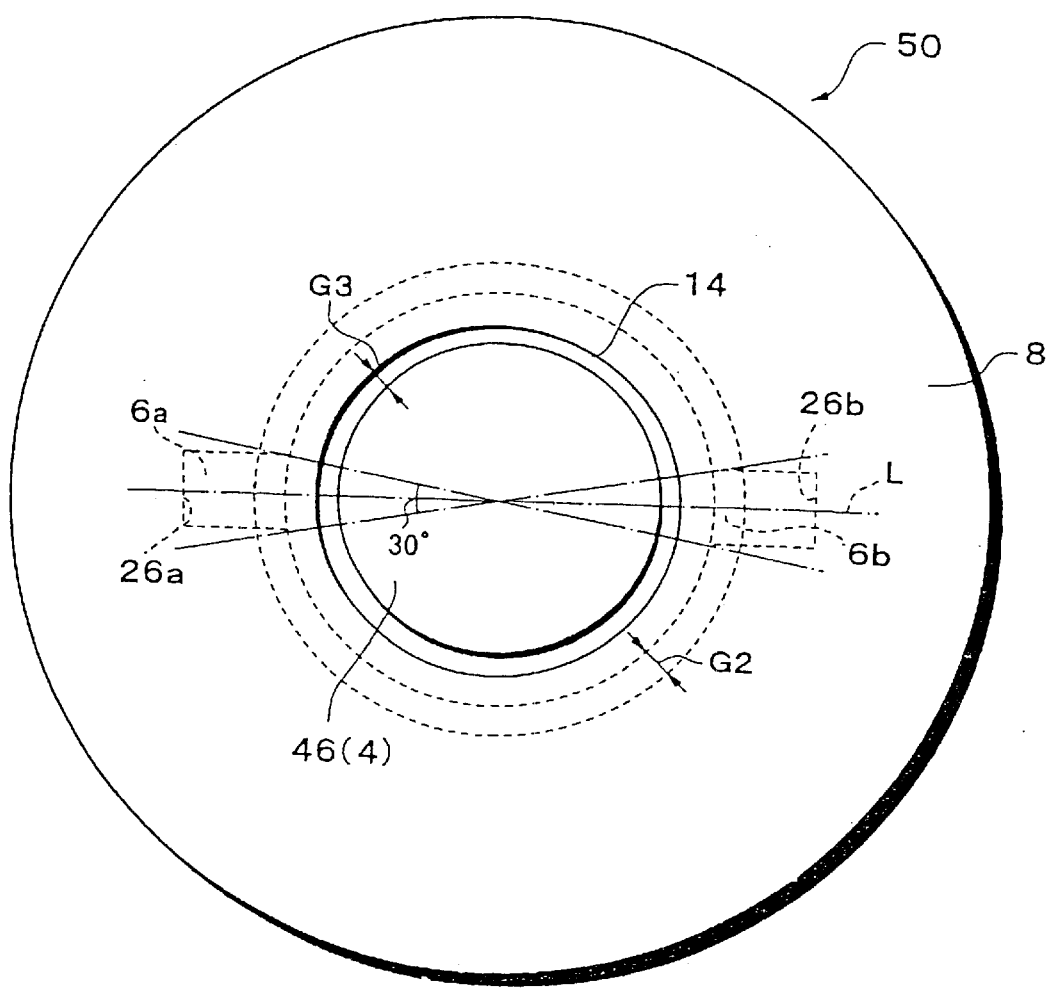
FIG. 6 is a plan view of the blow molding die shown in FIG. 1.

Then, a method for producing two films by blown film forming of a thermoplastic resin which manifests anisotropy in molten state using the blow molding apparatus 70 shown in FIG. 5 will be further explained.

Figure 7:
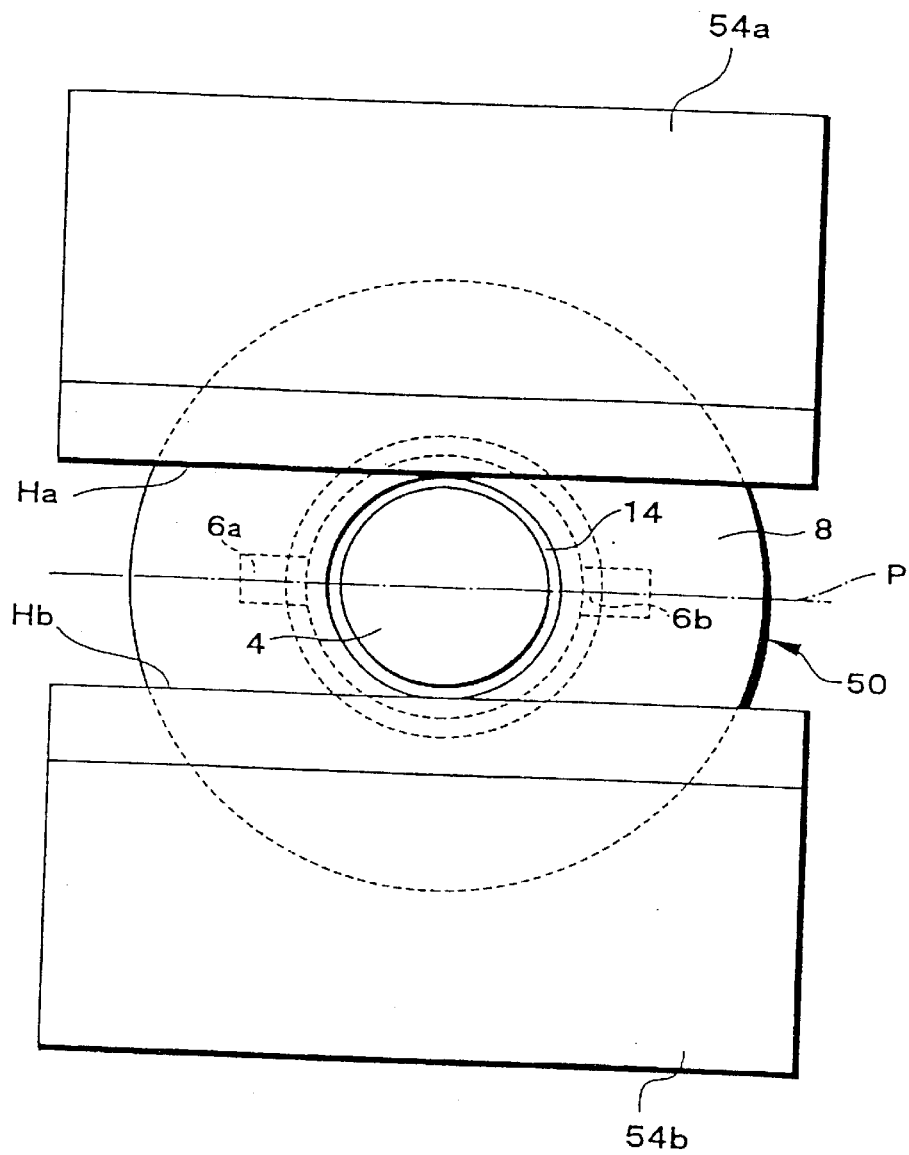
FIG. 7 is a plan view showing positional relation between two supporting means of the blow molding die and a pair of guide plates shown in FIG. 5.

First, a rotating table not shown is rotated previously so that leading end portions Ha, Hb of the guide plates 54a, 54b are approximately parallel to a line P connecting centers of the supporting means 6a, 6b as shown in FIG. 7.

Under such condition, the screw 52b is rotated by controlling the actuator 52a of the extruder 52 to make a resin in the form of solid particles stored in the hopper 52c into molten state and the molten resin is transferred into the blow molding die 50.

The melt kneaded resin is taken in through the resin inlet part 10 of the die 50, flows through the annular resin flow route 12 toward the upper part of the die 50, and is extruded to make cylindrical resin through the resin outlet part 14. In this case, the molten resin flowing through parts where the supporting means 6a, 6b thrust branches once due to existence of the supporting means 6a, 6b as shown in FIG. 3, however, since the supporting means 6a, 6b are in such size that they are placed in opposing intersecting regions at 30° formed by two lines passing through the central axis of the die body 2 and the ratio of the supporting means 6a, 6b occupying the resin flow route 12 is relatively low, the influence by branching of a resin is small. Also, since the vertical sectional form of the supporting means 6a, 6b is streamline, resistance which a resin receives is low and the resin flows relatively smoothly. Further, since gap between the outer upper part 24 of the die body 2 and the core upper part 44 of the mandrel 4 tapers and simultaneously since the inner diameter of the outer upper part 24 of the die body 2 becomes smaller from the lower part to the upper part, when a molten resin flows above the supporting means 6a, 6b, resin pressure increases and consequently flow of the molten resin stagnates. Therefore, a resin branched at the supporting means 6a, 6b quickly merge above the supporting means 6a, 6b. Further, when a molten resin passes through gap between the movable ring 8 and the core land part 46, rectification action occurs on the molten resin. Consequently, cylindrical resin is extruded through the resin outlet part 14 under condition wherein flow of a molten resin is uniform to a certain extent along peripheral direction, and a tubular film is formed by blowing a certain amount of air into this cylindrical resin to expand the cylindrical resin. Accordingly, weld line, unevenness in thickness and the like occurring in a tubular film by the influence of the supporting means 6a, 6b are reduced.

This tubular film J is flattened by the guide plates 54a, 54b and taken over by the pinch roller 56. In this operation, since leading end portions Ha, Hb of the guide plates 54a, 54b are approximately parallel to a line P connecting centers of the supporting means 6a, 6b as described above, slight weld line, unevenness in thickness and the like occurring in the tubular film by the influence of the supporting means 6a, 6b are present only in both edge portions of the tubular film.

This tubular film flattened is transferred to the slit 58 via the guide roller 62, and both edge portions of the tubular film are cut by this slit 58. By this, two films having almost no weld line, unevenness in thickness and the like are made. Then, two films are transferred to the winders 60a, 60b respectively via guide rollers 63 and 64, and wound up by these winders 60a, 60b.

According to the present practical embodiment as described above, since the supporting means 6a, 6b are placed opposing each other on a line passing through the central axis of the mandrel 4 and since the guide plates 54a, 54b are so placed that leading end portions Ha, Hb of the guide plates 54a, 54b are approximately parallel to a line P connecting centers of the supporting means 6a, 6b, when the tubular film is flattened by the guide plates 54a, 54b, slight weld line, unevenness in thickness and the like occurring in the tubular film by the influence of the supporting means 6a, 6b are present only in both edge portions of the tubular film. Therefore, by cutting both edge portions of the tubular film by the slit 58, two films having excellent appearance and having almost no weld line, unevenness in thickness and the like can be produced. Further, since unevenness in thickness is thus reduced, tensile strength along transverse direction of films increases, and as a result, properties of the film are improved.

In this embodiment, since the ratio of the supporting means 6a, 6b occupying the resin flow route 12 is relatively small, when a tubular film is flattened by the guide plates 54a, 54b, area occupied by weld line, unevenness in thickness and the like occurring in both edge portions of the tubular film decreases and consequently, two films of relatively large width can be produced.

In the present practical embodiment, the mandrel 4 is supported to the die body 2 by two supporting means 6a, 6b and simultaneously the supporting means 6a, 6b are in such size that they are placed in opposing intersecting regions at 30° formed by two lines passing through the central axis of the mandrel 4, however, the number and size of the supporting means are not restricted to the described embodiment and it may be advantageously permissible that the supporting means are placed in one of two opposing intersecting regions formed by two lined passing through the central line of the mandrel 4. In this case, the guide plates 54a, 54b are so placed that leading end portions Ha, Hb of the guide plates 54a, 54b are approximately parallel to a line connecting centers of one of the above-described two pairs of opposing intersecting angle regions.

In this case, for reducing area occupied by weld line, unevenness in thickness and the like occurring in both edge portions of a tubular film when the tubular film is flattened by the guide plates 54a, 54b, it is preferable that at least one of several supporting means is placed in one of the opposing intersecting regions at 45° formed by two lines passing through the central axis of the mandrel 4 and another supporting means is placed in other opposing intersecting region at 45°.

Further, in this practical embodiment, the extruder 52 and the blow molding die 50 are fixed on the floor, and the guide plates 54a, 54b, pinch roll 56, slitter 58, winders 60a, 60b, guide rollers 62 to 64 are placed on a rotation table not shown, however, it may also permissible that the guide plates 54a, 54b, pinch roll 56, slitter 58, winders 60a, 60b, guide rollers 62 to 64 are fixed and the extruder 52 and the blow molding die 50 are enabled to rotate.

According the present invention, a film can be obtained having excellent properties and good appearance in which weld line and unevenness in thickness are reduced in conducting blown film forming from a thermoplastic resin manifesting anisotropy in molten state.

The blow molding die of the present invention, which has a simple structure compared with a conventional spider die, can be produced easily and cost of a die itself can be reduced significantly.

What is claimed is:

1. A blow molding die used in forming a blown film from a thermoplastic resin which manifests anisotropy in molten state, wherein the die comprises:

a die body having a hollow portion;

a mandrel placed in the hollow portion of said die body;

a plurality of supporting means which are placed in an annular resin flow path formed in a gap between said die body and said mandrel; and an aeration path for passing a gas to expand cylindrical resin extruded through a resin outlet of said resin flow path, at least one of said plurality of supporting means being located in one of opposing intersecting regions of 45° formed by two lines passing through the central line of said mandrel and other supporting means being located in other opposing intersecting regions at 45°, the total maximum horizontal cross section of said plurality of supporting means is one-fifth or less of the horizontal cross section of said resin flow route at any location of said plurality of supporting means, and said resin flow path having a horizontal cross section decreasing toward said resin outlet from said plurality of supporting means.

2. The blow molding die according to claim 1, wherein said horizontal cross section of said resin flow path at said resin outlet is from $1/15$ to $1/2$ of the horizontal cross section of said resin flow path at an upper adjacent portion of said supporting means.

3. The blow molding die according to claim 1, wherein the vertical sectional form of said supporting means is streamlined.

4. The blow molding die according to claim 1, wherein the number of said supporting means is two, and one of these two supporting means is placed in one of said opposing intersecting regions at 45° and another supporting means is placed in other opposing intersecting regions at 45°.

5. The blow molding die according to claim 4, wherein said two supporting means are placed opposing each other on a line passing through the central axis of said mandrel.

* * * * *